United States Patent
Sudo

(10) Patent No.: US 7,435,493 B2
(45) Date of Patent: Oct. 14, 2008

(54) FUEL CELL AND METHOD FOR OPERATING THE SAME

(75) Inventor: Go Sudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 131 days.

(21) Appl. No.: 10/831,938

(22) Filed: Apr. 26, 2004

(65) Prior Publication Data
US 2005/0037248 A1 Feb. 17, 2005

(30) Foreign Application Priority Data
Apr. 28, 2003 (JP) ............................... 2003-123288

(51) Int. Cl.
*H01M 8/04* (2006.01)
*H01M 8/24* (2006.01)

(52) U.S. Cl. .............................. 429/23; 429/13; 429/22

(58) Field of Classification Search ........................ None
See application file for complete search history.

(56) References Cited

U.S. PATENT DOCUMENTS

| 3,843,410 | A | 10/1974 | Spahrbier |
| 6,673,480 | B1 * | 1/2004 | Wilkinson et al. ............ 429/13 |
| 6,893,756 | B2 * | 5/2005 | Clingerman et al. .......... 429/22 |
| 2005/0110453 | A1 * | 5/2005 | Lecky ........................ 320/101 |
| 2006/0159968 | A1 * | 7/2006 | Sudo et al. ..................... 429/22 |

FOREIGN PATENT DOCUMENTS

| DE | 10010985 | 9/2001 |
| EP | 0181569 | 5/1986 |
| EP | 1280218 | 1/2003 |
| JP | 2003-022830 | * 1/2003 |
| WO | WO 97/50140 | 12/1997 |
| WO | WO 00/02282 | 1/2000 |

* cited by examiner

*Primary Examiner*—John S Maples
(74) *Attorney, Agent, or Firm*—Robert J. Depke; Rockey, Depje & Lyons, LLC.

(57) ABSTRACT

In a cell stack of fuel cells according to the present invention, an output power density is measured at each of an upstream-side electricity generating section, which is located at an upstream-side of flow of fuel, and a downstream-side electricity generating section located at a downstream-side thereof. If the voltage at the upstream-side is higher than that at the downstream-side, a control operation to increase the concentration of fuel is performed. Conversely, if the voltage at the upstream-side is lower, a control operation to decrease the concentration of fuel is performed. Control directed to fuel concentration maximizing electricity generating efficiency may be implemented by repeatedly performing such control operations. There is no necessity for providing a concentration sensor in each of the generating sections. Consequently, simplification of configuration of and reduction in the size of the fuel cell may be achieved.

8 Claims, 5 Drawing Sheets

FUEL CELL AND METHOD FOR OPERATING THE SAME

CROSS REFERENCES TO RELATED APPLICATIONS

The present invention claims priority to its priority document No. 2003-123288 filed in the Japanese Patent Office on Apr. 28, 2003, the entire contents of which being incorporated by reference herein.

BACKGROUND OF THE INVENTION

1. Field of the Invention

The present invention relates to a fuel cell provided with a fuel electrode and an air electrode, which sandwich an electrolyte, and to a method for operating a fuel cell. Specifically, the present invention relates to a direct methanol fuel cell using methanol as fuel for power generation, and to a method for operating a fuel cell.

2. Description of Related Art

A fuel cell is a power generating device for generating electric power by electrochemically reacting fuel with oxygen (oxidant gas). The fuel cell has attracted attention in recent years as a power generating device that does not pollute the environment, because the product of power generation performed therein is mainly water. There are attempts to use fuel cells as, for example, a drive power source for driving an automobile, and a household cogeneration system.

Fuel cells for use as drive power sources in, for instance, portable electronic devices, such as a notebook personal computer, a portable phone, and a PDA (Personal Digital Assistant), are energetically developed, in addition to those for drive power sources for driving automobiles. It is important for such fuel cells to stably output necessary electric power and to have a portable size and weight. Various techniques are energetically developed so as to meet such requirements.

Fuel cells are classified into various types according to kinds of electrolyte, fuel supply methods, and so on. A direct methanol fuel cell (DMFC) using methanol as fuel without being reformed into hydrogen has been proposed. In the DMFC, at an anode side, mainly the following reaction occurs:

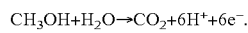

$$CH_3OH + H_2O \rightarrow CO_2 + 6H^+ + 6e^-.$$

At a cathode side, mainly the following reaction occurs:

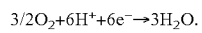

$$3/2 O_2 + 6H^+ + 6e^- \rightarrow 3H_2O.$$

Protons ($H^+$) generated at the anode side are transported through an electrolyte to the cathode side. Thus, the following overall reaction occurs to generate water and carbon dioxide together with electricity:

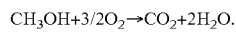

$$CH_3OH + 3/2 O_2 \rightarrow CO_2 + 2H_2O.$$

The DMFC requires supplying a fuel, which is a mixture of water and methanol, to the anode, because an electricity generating reaction does not proceed at the anode even if pure methanol is simply supplied as fuel thereto. As a fuel supply method to be performed at that time, a method of preliminarily mixing methanol and water at an appropriate composition ratio has been proposed. Further, another method has been proposed, wherein a fuel channel, in which fuel is circulated, is provided and pure methanol is replenished thereinto thereby to compensate for shortage of methanol component, which is caused by consumption thereof in the electricity generating reaction, and wherein water generated in the electricity generating reaction is collected and mixed into the fuel.

SUMMARY OF THE INVENTION

In the case where methanol and water are preliminarily mixed as fuel, a fuel cell system does not require having a device for mixing methanol and water. Thus, the structure of the fuel cell system can be simplified. However, methanol to be supplied is preliminarily mixed with water, so that energy density of fuel itself is reduced.

If fuel containing a high concentration of methanol is used for increasing the energy density thereof, methanol crosses over a proton-conducting ion exchange membrane. This not only reduces electricity generating efficiency of the fuel cell but facilitates deterioration of an MEA (Membrane Electrode Assembly) serving as an electricity generating element, so that life of the fuel cell is shortened. Further, it is necessary to mix pure methanol and water in a process of manufacturing fuel before the fuel is supplied to the fuel cell. In a case where fuel is preserved in a state in which methanol and water are mixed, there is possibility that a problem of stabilizing a methanol concentration over a long time may occur.

On the other hand, in a case where the water produced by generating electricity is collected and reused for mixing the fuel, it is necessary for maintaining the concentration of methanol contained in the fuel to install a sensor for measuring the methanol concentration. Generally, methanol concentration sensors currently in practical use are large in size. Thus, related art has problems in that it is difficult to incorporate the methanol concentration sensors into the fuel cell system, and that the fuel cell system itself is complicated and large-sized.

Although Published Japanese Translation (KOHYO) No. 2002-520778 of PCT international publication No. WO 00/02282 proposed techniques for implementing functions similar to those of a sensor by using a cell differing in structure from other cells, the proposed techniques do not sufficiently solve the problems of complication and enlargement of fuel cell systems.

Accordingly, it is desirable to provide a fuel cell enabled to adjust a fuel concentration by using a simple configuration to an optimum value for generating electricity, and to provide a method of operating a fuel cell. The present invention is accomplished in view of the above.

According to an aspect of the present invention, there is provided a fuel cell including plural electricity generating units each having an electrolyte, on both sides of which a fuel electrode and an air electrode are respectively disposed. This fuel cell includes an upstream-side generating section formed by the electricity generating units located at an upstream-side in a direction of flow of fuel, a downstream-side generating section formed by the electricity generating units located at a downstream-side in the direction of flow of fuel, and a fuel concentration adjusting section for adjusting a concentration of fuel supplied to the fuel electrode in accordance with an output power density at the upstream-side generating section and an output power density at the downstream-side generating section.

The output power density at the electricity generating sections has a maximum value at a certain fuel concentration. Accordingly, it may be determined according to the difference in voltage between the upstream-side generating section at which a higher fuel concentration is provided, and the downstream-side generating section at which a lower fuel concentration is provided, how to control the fuel concentration so as to maximize the output power density. Accordingly, an optimum fuel concentration for generating electricity may be realized, without providing a concentration sensor in each of the generating sections, by adjusting the fuel concentration according to the output power density at the generating section placed at the upstream-side and to that at the generating section placed at the downstream-side. Because the concentration sensors are unnecessary, simplification of configuration of and reduction in the size of the fuel cell may be achieved.

The fuel concentration adjusting section maybe adapted to set the fuel concentration at a higher value if the output power density at the electricity generating units of the upstream-side generating section is higher than that of the electricity generating units of the downstream-side generating section. Further, the fuel concentration adjusting section may be adapted to set the fuel concentration at a lower value if the output power density at the electricity generating units of the upstream-side generating section is lower than that of the electricity generating units of the downstream-side generating section. This enables adjustment of the fuel cell, which targets a maximum value of the output power density associated with the fuel concentration.

Further, by providing the fuel cell with a water collection section for collecting water produced by generating electricity at the electricity generating units and for supplying the water to the fuel concentration adjusting section, the water produced by generating electricity may be used for adjusting the fuel concentration. Alternatively, a recycling-type fuel concentration adjustment, in which fuel, whose concentration is reduced by an electricity generating reaction, is mixed with high purity fuel, may be performed by returning fuel, which has passed through the fuel electrode of the downstream-side generating section, to the fuel concentration adjusting section.

The number of electricity generating units of the upstream-side generating section may be set to be equal to that of electricity generating units of the downstream-side generating section. Alternatively, the number of electricity generating units of the upstream-side generating section may be set to be larger than that of electricity generating units of the downstream-side generating section. In the case that the number of electricity generating units of the upstream-side generating section is set to be larger than that of electricity generating units of the downstream-side generating section, the flow rate of fuel flowing through each single layer of the downstream-side generating section is higher than that of fuel flowing through each single layer of the upstream-side generating section. Thus, the electricity generating efficiency may be enhanced by increasing the flow rate of fuel at the downstream-side even if the concentration of the fuel is reduced by generating electricity.

The electricity generating units of the upstream-side generating section may be arranged in parallel with a direction of flow of fuel. Further, the electricity generating units of the downstream-side generating section may be arranged in parallel with the direction of flow of fuel. An aqueous solution containing alcohol, such as methanol, may be used as fuel.

According to another aspect of the present invention, there is provided a method of operating a fuel cell including plural electricity generating units each having an electrolyte, on both sides of which a fuel electrode and an air electrode are respectively disposed. In the present method, the concentration of fuel to be supplied to the fuel cell is adjusted according to an output power density at an upstream-side electricity generating units placed at an upstream-side in the direction of flow of fuel, and to an output power density at a downstream-side electricity generating units placed at a downstream-side in the direction of flow of fuel.

An optimum fuel concentration for generating electricity can be realized, without providing a concentration sensor in each of electricity generating sections, by adjusting the fuel concentration according to an output power density at the upstream-side electricity generating units placed at an upstream-side in the direction of flow of fuel, and to an output power density at the downstream-side electricity generating units placed at a downstream-side in the direction of flow of fuel. Because concentration sensors are unnecessary, simplification of configuration of and reduction in the size of the fuel cell can be achieved.

BRIEF DESCRIPTION OF THE DRAWINGS

The above and other objects, features and advantages of the present invention will become more apparent from the following description of the presently exemplary embodiment of the invention taken in conjunction with the accompanying drawings, in which.

DETAILED DESCRIPTION OF THE EMBODIMENTS

First Embodiment

Hereinafter, a fuel cell and a fuel cell operating method, to which the present invention is applied, are described in detail with reference to the accompanying drawings. Incidentally, the present invention is not limited by the following description. Appropriate changes may be made without departing from the scope of the present invention. Incidentally, although an example using an aqueous solution, in which methanol and water are mixed as fuel is described in the description of this embodiment, another aqueous solution, in which another organic solvent and water are mixed, may be used.

The fuel cell of the present invention has a structure, in which electricity generating devices are arranged in parallel with a direction of flow of fuel to thereby constitute an upstream-side generating section and a downstream-side generating section, and in which the upstream-side generating section and the downstream-side generating section are arranged in series in the direction of flow of fuel.

Figure 1:
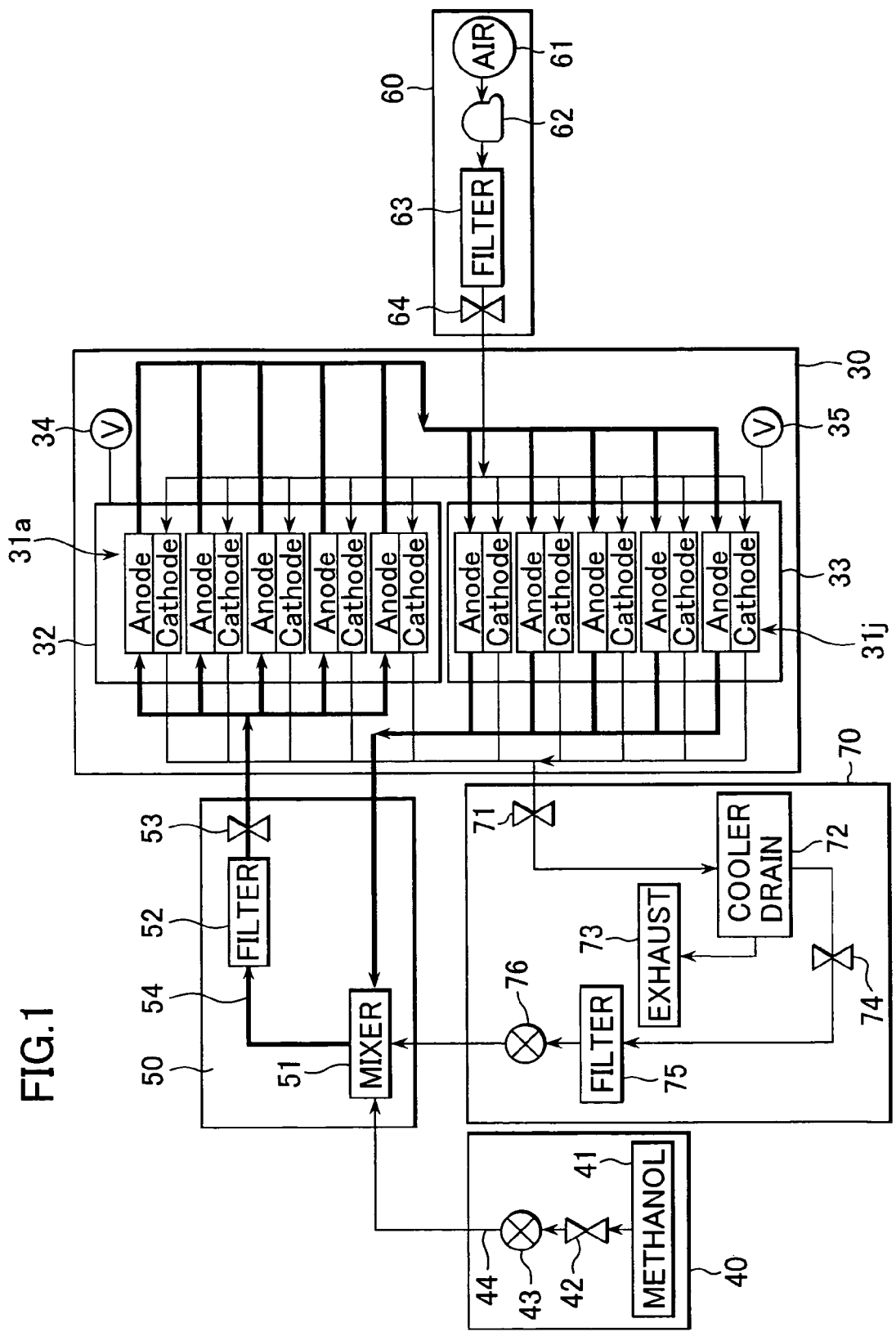
FIG. 1 is a block diagram illustrating the configuration of a fuel cell in accordance with a first embodiment of the present invention, in which thick arrows indicate flows of fuel.

FIG. 1 is a block diagram illustrating the configuration of a fuel cell according to the present invention, which shows flows of fuel and air. As illustrated in the figures, the fuel cell has an electricity generating section 30 having a stack structure in which plural electricity generating devices are stacked, a fuel supply section 40 for supplying methanol serving as fuel, a fuel concentration adjusting section 50 for circulating fuel and for adjusting a fuel concentration, an air supply section 60 for supplying air, which contains oxygen, to the electricity generating section 30, and a water collection section 70 for collecting water generated in the electricity generating section 30. In this figure, thick arrows indicate flows of fuel at the sections, while thin arrows designate flows of air, water, and methanol.

Figure 2:
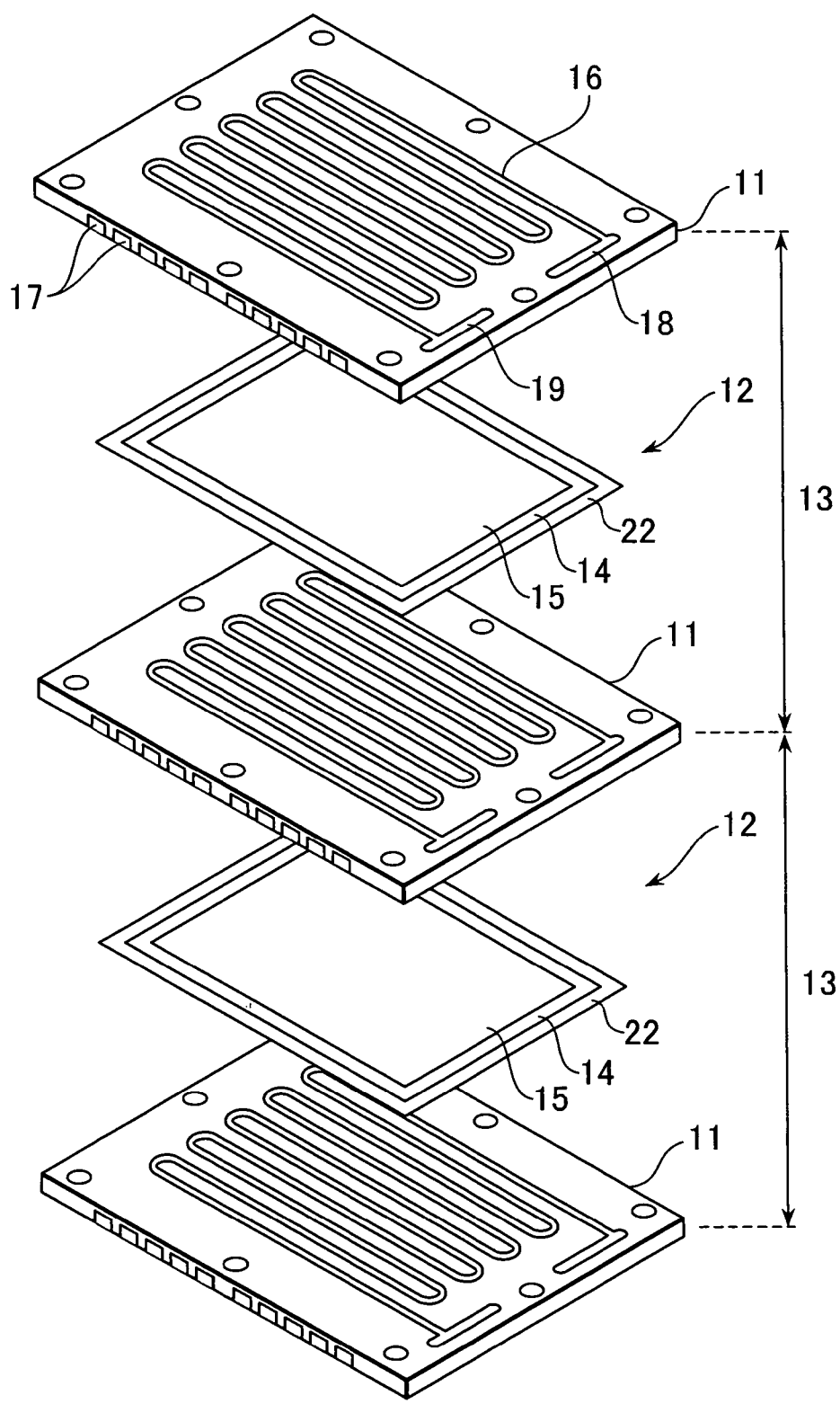
FIG. 2 is an exploded perspective diagram illustrating the structure of a cell stack according to a first embodiment of the present invention, in which plural electricity generating devices are stacked.

The electricity generating section 30 has a cell stack structure in which ten layers of electricity generating devices respectively including MEAs 31$a$ to 31$j$ each having an electrolyte 13 sandwiched by electrodes 14 from both an anode side and a cathode side thereof are stacked, as shown in FIG. 2 to be described later. Among the MEAs of the ten layers of electricity generating devices, the five MEAs 31$a$ to 31$e$ are arranged in parallel with flow of fuel at the upstream-side thereof to thereby constitute an upstream-side generating section 32, while the remaining five MEAs 31$f$ to 31$j$ are arranged in parallel with flow of fuel at the downstream-side thereof to thereby constitute a downstream-side generating section 33. An upstream-side voltmeter 34 for measuring a voltage Vu at the upstream-side generating section 32 is connected to the upstream-side generating section 32. A downstream-side voltmeter 35 for measuring a voltage Vd at the downstream-side generating section 33 is connected to the downstream-side generating section 33.

The layers of the upstream-side generating section 32 are connected in series with those of the downstream-side generating section 33 in the direction of flow of fuel. That is, the electricity generating devices of the upstream-side generating section 32 are connected in series with those of the downstream-side generating section 33 in the direction of flow of electric current, so that electric currents respectively flowing in the electricity generating devices are equal to one another. Therefore, an output power density of each of the electricity generating devices provided at the upstream-side can be obtained by measuring the voltage Vu at the stack structure of the upstream-side generating section 32 through the use of the upstream-side voltmeter 34 and then dividing the measured voltage Vu by the number of the electricity generating devices contained in the upstream-side generating section 32. Further, an output power density of each of the electricity generating devices provided at the downstream-side can be obtained by measuring the voltage Vd at the stack structure of the downstream-side generating section 33 through the use of the upstream-side voltmeter 35 and then dividing the measured voltage Vd by the number of the electricity generating devices contained in the downstream-side generating section 33.

The upstream-side generating section 32 and the downstream-side generating section 33 are connected in series with each other in the direction of flow of fuel. Fuel supplied from the fuel concentration adjusting section 50 passes through a fuel channel of each of the layers of the upstream-side generating section 32 and is then partly consumed at the anode side. Subsequently, the fuel, whose concentration is lowered by an electricity generating reaction in the upstream-side generating section 32, flows into a fuel channel of each of the layers of the downstream-side generating section 33. The fuel having passed through the downstream-side generating section 33 reaches the fuel concentration adjusting section 50 again. Thus, the fuel circulates between the electricity generating section 30 and the fuel concentration adjusting section 50. Oxygen used for generating electricity in the upstream-side generating section 32 and the downstream-side generating section 33 is supplied to an air channel of each of the layers. Water generated at the cathode side at generation of electricity is exhausted together with air to the water collection section 70.

The fuel supply section 40 is a section for supplying methanol, which is used in the electricity generating section 30 as fuel, to the fuel concentration adjusting section 50. A fuel tank 41, a valve 42, and a pump 43 are connected to the fuel supply section 40 through a pipe 44 that is connected to the fuel concentration adjusting section 50. Pure methanol is stored in the fuel tank 41. Methanol is supplied there from to the fuel concentration adjusting section 50 by opening and closing the valve 42 and driving a pump 43. An amount of methanol to be supplied to the fuel concentration adjusting section 50 can be adjusted by adjusting the valve 42 and controlling the pump 43.

A mixer 51, a filter 52, and a valve 53 are connected to the fuel concentration adjusting section 50 through a fuel pipe 54. The mixer 51 adjusts the methanol concentration of fuel, which is an aqueous solution containing methanol, by mixing pure methanol supplied from the fuel supply section 40, fuel collected from the electricity generating section 30, and water supplied from the water collection section 70 according to the voltage Vu measured by the upstream-side voltmeter 34 and the voltage Vd measured by the downstream-side voltmeter 35. The filter 52 filtrates dust and impurities from fuel to thereby eliminate the dust and the impurities. The valve 53 adjusts an amount of fuel supplied to the electricity generating section 30 by controlling opening/closing thereof. The fuel, whose methanol concentration is adjusted by the mixer 51, is sent to the electricity generating section 30 through the fuel pipe 54. In this embodiment, the rate of flow of fuel is controlled so that the utilization factor of methanol is 20% if fuel having a concentration of 3% circulates once in the electricity generating section 30, so as to set the methanol concentration to be a dominant factor affecting the electricity generating efficiency.

The air supply section 60 has an outside air intake 61, a blower 62, a filter 63, and a valve 64. Air containing oxygen is taken in from the outside air intake 61, and the air is then supplied by the blower 62 to the electricity generating section 30. The filter 63 removes dust from the air taken in from the outside air intake 61. Then, the flow rate of the air is adjusted, and subsequently sent to the electricity generating section 30.

The water collection section 70 collects water generated at the cathode side of each of the layers of the electricity generating section 30. Exhaust gas having passed through the cathode side of each of the layers of the electricity generating section 30 contains water generated in the electricity generating reaction and is exhausted to the water collection section 70. In the water collection section 70, the flow rate of the exhaust gas is adjusted by the valve 71. Then, the exhaust gas is cooled down by a cooler drain 72 to thereby distill steam. Dry air, from which water has been eliminated by the cooler drain 72, is exhausted to the atmosphere. The water having been extracted from the cooler drain 72 is sent by a pump 76 through a valve 74 and a filter 75 to the fuel concentration adjusting section 50, in which the water is used for adjusting the concentration of fuel. At that time, the quantity of the water supplied to the fuel concentration adjusting section 50 is adjusted by controlling opening/closing of the valve 74 and also controlling driving of the pump 76. The filter 75 removes dirt and impurities contained in the water.

Thus, in the fuel cell shown in FIG. 1, the fuel supply section 40 supplies pure methanol to the fuel concentration adjusting section 50. Then, the fuel concentration adjusting section 50 adjusts a fuel concentration by mixing fuel, which is returned from the electricity generating section 30, and pure methanol supplied from the fuel supply section 40. Subsequently, the fuel concentration adjusting section 50 circulates the fuel to the electricity generating section 30. The water supplied from the water collection section 70 is also used for adjusting the fuel concentration of the fuel concentration adjusting section 50. In the electricity generating section 30, the fuel sent from the fuel concentration adjusting section 50 is first used at the upstream-side generating section 32. Then, the fuel, whose concentration is reduced, is used at the downstream-side generating section 33. Thus, electricity is generated therein.

FIG. 2 is an exploded perspective diagram illustrating an example of a cell stack structure of the fuel cell according to the present invention. As shown in FIG. 2, an electricity generating device 13 includes two separators 11, and an MEA 12 sandwiched between these two separators 11. Incidentally, this figure shows the cell stack structure constructed by stacking two electricity generating devices 13. However, the cell stack may be constructed by stacking a larger number of electricity generating devices 13.

The MEA 12 is formed of an ion-conducting electrolyte 14 and electrodes 15 that sandwich this electrolyte 14 from both sides thereof. For example, a perfluoro-sulfonic-acid solid polymer electrolyte membrane may be used as the electrolyte 14. An example of the electrode 15 is an electrode carrying platinum that serves as a catalyst for promoting the electricity generating reaction.

The separator 11 is a plate-like member having a front side, in which a fuel channel 16 serving as a meander-like groove is formed, as viewed in this figure, and also having a rear side, in which air channels 17 serving as plural grooves are formed, as viewed in this figure. Air is supplied from the outside to the air channels 17 by an air supply fan or the like, so that air flow in the stack structure of the fuel cell is realized.

A fuel supply port 18 serving as a fuel inlet, and a fuel discharge port 19 serving as a fuel outlet are formed in each of the separators 11 in such a way as to penetrate therethrough in the direction of thickness thereof. An end of the fuel channel 16 is connected to the fuel supply port 18, while the other end thereof is connected to the fuel discharge port 19. If the plural separators 11 are superimposed, the fuel supply port 18 and the fuel discharge port 19 communicate with each other and constitute a fuel supply channel and a fuel discharge channel, respectively.

A sealing member 22 for sealing between the separator 11 and the MEA 12 at formation of the stack structure, which is performed by stacking the electricity generating devices 13, is disposed in the vicinity of the circumferential edge of the MEA 12. This sealing member 22 is formed by a material, which can sufficiently insulate the circumferential part of the separator 11 from that of the MEA 12. Preferably, a material having high thermal conductivity is used as that of the sealing member 22 so as to enhance heat dissipation of the cell stack.

If a mixture of methanol and water, which is fuel, is supplied to the fuel supply port 18 of the cell stack structure shown in FIG. 2, the fuel flows into the fuel channels 16 formed in the plural electricity generating device 13, which communicate with the fuel supply port 18. Thereafter, the fuel having passed through the fuel channels 16 are exhausted to the outside of the cell stack from the fuel discharge port 19. In the process, during which the fuel passes through the fuel channels 16, the following reaction occurs at the anode side of the MEA 12:

$CH_3OH+H_2O \rightarrow CO_2+6H^++6e^-$.

If air containing oxygen is supplied to the air channels 17 of the MEA 12 from the outside thereof, the following reaction occurs at the cathode side of the MEA 12:

$3/2O_2+6H^++6e^- \rightarrow 3H_2O$.

Protons ($H^+$) generated at the anode side are transported through the electrolyte to the cathode side. Thus, the following overall reaction occurs to generate water and carbon dioxide together with electricity:

$CH_3OH+3/2O_2 \rightarrow CO_2+2H_2O$.

The arrangement of the electricity generating devices 13 in parallel with the direction of flow of fuel means that the flow of the fuel supplied to the fuel supply ports 18 branches off into the layers of the electricity generating devices 13 of the cell stack, in which the fuel supply ports 18 communicate with one another. Thus, in the case where the electricity generating devices 13 are arranged in parallel with the direction of flow of fuel, the methanol concentration of fuel flows respectively flowing into the fuel channels 16 of the layers are equal to one another, because the fuel supplied to the fuel supply ports 18 branches off into the layers of the electricity generating devices 13.

The plural electricity generating devices 13 are arranged in parallel with the flow of the fuel at the upstream-side thereof as having a cell stack structure to thereby constitute an upstream-side generating section 32. Furthermore, other plural electricity generating devices 13 are arranged in parallel with flow of fuel at the downstream-side thereof as having another cell stack structure to thereby constitute a downstream-side generating section 33. The arrangement of the upstream-side generating section 32 and the downstream-side generating section 33 in series in the direction of the flow of the fuel means that the fuel discharge port 19 of the upstream-side generating section 32 is connected to the fuel supply port 18 of the downstream-side generating section 33, the fuel passes through the downstream-side electricity generating section 33 after passing through the upstream-side generating section 32. That is, the fuels having flowed through the fuel channels 16 of the layers of the upstream-side generating section 32 in parallel with one another flow through the fuel channels 16 of the layers of the downstream-side generating section 33 in parallel with one another.

Figure 3:
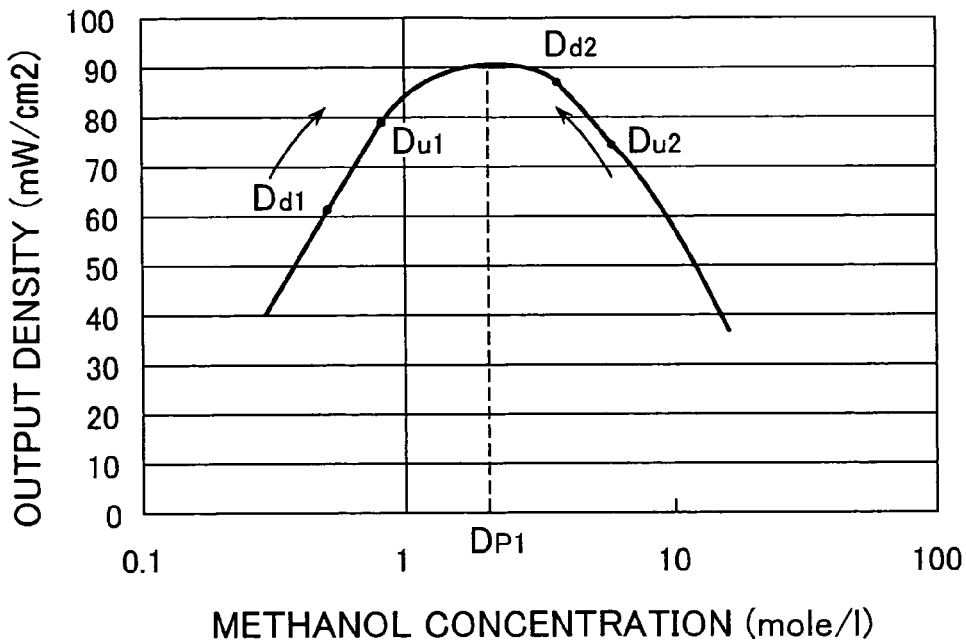
FIG. 3 is a graph illustrating the relation between the methanol concentration of fuel in a first embodiment of the present invention and an output power density thereof.

Next, the adjustment of fuel concentration of the fuel concentration adjusting section 50 is described with reference to FIG. 3. FIG. 3 is a graph illustrating the relation between the methanol concentration of fuel and the output power density caused by generating electricity. If the methanol concentration of fuel supplied to the electricity generating device is low, methanol used for generating electricity is not sufficiently supplied thereto, so that the output power density is reduced. Conversely, if the methanol concentration of fuel supplied to the electricity generating device is high, methanol permeates from the anode by the crossover to be used for generating electricity undergoes directly an oxidation reaction, so that deterioration of characteristics of a electricity generating device occurs, and that the output power density is lowered.

Thus, there is a methanol concentration $D_{pi}$ (molecule/l), at which the output power density has a maximum value. Consequently, the electricity generating efficiency of the fuel cell can be maximized by adjusting the methanol concentration of the fuel cell so that the fuel density always has the value $D_{pi}$.

As above-mentioned, in the fuel cell according to the present invention, the upstream-side generating section 32 is disposed at the upstream-side in the direction of flow of fuel, while the downstream-side generating section 33 is disposed at the downstream-side in the direction of flow of fuel. Fuel circulated between the electricity generating section 30 and the fuel concentration adjusting section 50 is utilized in an electricity generating reaction in the downstream-side generating section 33 after utilized in an electricity generating reaction in the upstream-side generating section 32. Therefore, the methanol concentration at the upstream-side generating section 32 is always higher than that at the downstream-side generating section 33. Conversely, the methanol concentration at the downstream-side generating section 33 is always lower than that at the upstream-side generating section 32.

Let $D_{u1}$ and $D_{d1}$ respectively denote a methanol concentration at the upstream-side generating section 32 and a methanol concentration at the downstream-side generating section 33 in the case where the concentration of methanol supplied to the upstream-side generating section 32 is lower than the methanol concentration $D_{pi}$, at which the output power density is maximized. As shown in the graph, in a case that the methanol concentration is equal to or lower than $D_{pi}$, the higher the methanol concentration, the higher the output power density. Thus, the output power density at the methanol concentration $D_{u1}$ becomes higher than the output power density at the methanol concentration $D_{d1}$. Consequently, in the case where the output power density of the upstream-side generating section 32 is higher than that of the downstream-side generating section 33, the methanol concentration can be brought closer to the methanol concentration $D_{pi}$, at which the output power density is maximized, by increasing the methanol concentration of fuel.

Let $D_{u2}$ and $D_{d2}$ respectively denote a methanol concentration at the upstream-side generating section 32 and a methanol concentration at the downstream-side generating section 33 in the case where the concentration of methanol supplied to the upstream-side generating section 32 is higher than the methanol concentration $D_{pi}$, at which the output power density is maximized. As shown in the graph, in a case that the methanol concentration is equal to or higher than $D_{pi}$, the higher the methanol concentration, the lower the output power density. Thus, the output power density at the methanol concentration $D_{u2}$ becomes lower than the output power density at the methanol concentration $D_{d2}$. Consequently, in the case where the output power density of the upstream-side generating section 32 is lower than that of the downstream-side generating section 33, the methanol concentration can be brought closer to the methanol concentration $D_{pi}$, at which the output power density is maximized, by decreasing the methanol concentration of fuel.

Even in a case that the methanol concentration at the upstream-side generating section 32 is higher than the methanol concentration $D_{pi}$, and that the methanol concentration at the downstream-side generating section 33 is lower than the methanol concentration $D_{pi}$, if the output power density at the upstream-side is higher than that at the downstream-side, the methanol concentration is controlled in such a way as to be increased, as above-mentioned. If the output power density at the upstream-side is lower than that at the downstream-side, the methanol concentration is controlled in such a way as to be decreased. In a case where the output power density at the upstream-side generating section 32 is equal to that at the downstream-side generating section 33, the methanol concentration of fuel is unchanged.

Figure 4:
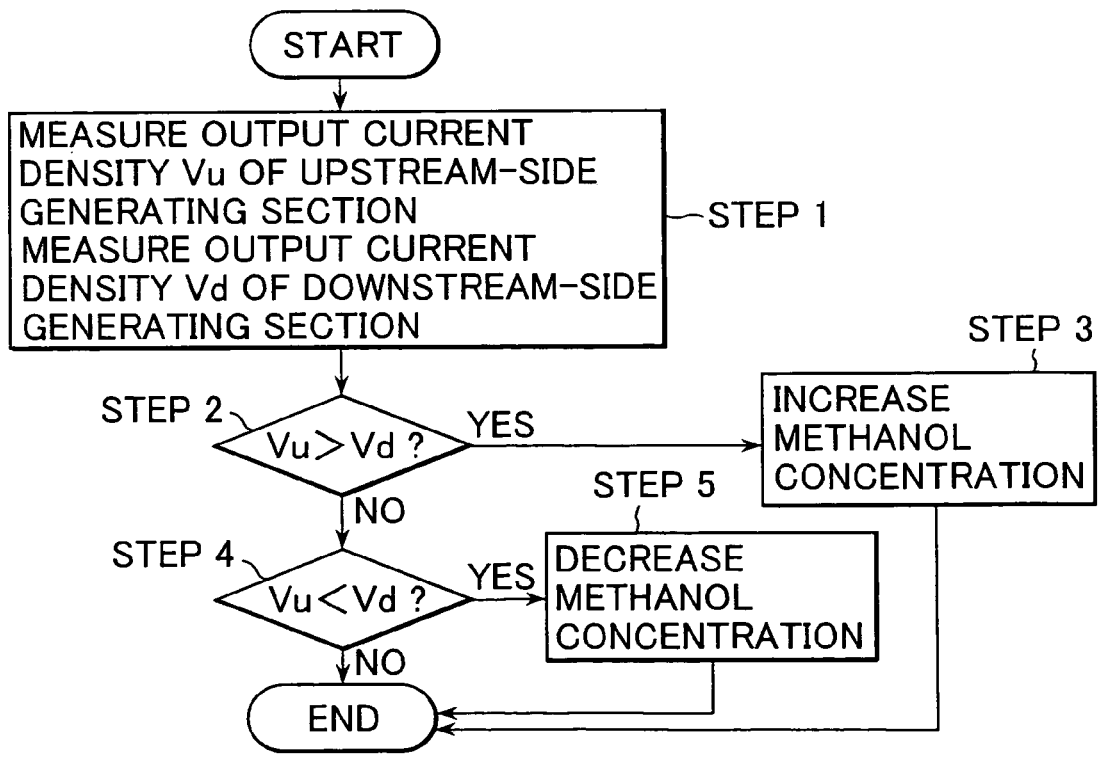
FIG. 4 is a flowchart illustrating the procedure for adjusting the methanol concentration of the fuel cell according to an embodiment of the present invention.

FIG. 4 shows a flowchart illustrating the procedure for adjusting the methanol concentration of the fuel cell according to the present invention. Although a fuel concentration control routine illustrated in FIG. 4 is periodically called and executed, this routine may be a periodically executed in a case that some conditions are met.

In step 1, the upstream-side voltmeter 34 measures a voltage Vu of an output current generated by an electricity generating reaction of the upstream-side generating section 32, while the downstream-side voltmeter 35 measures a voltage Vd of an output current generated by an electricity generating reaction of the downstream-side generating section 33. After the measurement of the voltages Vu and Vd, the procedure advances to step 2.

In step 2, the mixer 51 compares the voltage Vu with the voltage Vd. If the voltage Vu is higher than the voltage Vd, the relation between the methanol concentration of fuel at the upstream-side generating section 32 and that at downstream-side generating section 33 is similar to that between the methanol concentrations $D_{u1}$ and $D_{d1}$ shown in FIG. 3. Thus, the procedure proceeds to step 3 so as to bring the methanol concentration closer to $D_{p1}$. In other cases, the procedure proceeds to step 4.

In step 3, to bring the methanol concentration closer to $D_{p1}$, the mixer 51 controls the methanol concentration in such a way as to increase. Thereafter, the procedure advances to END step. Thus, the fuel concentration control routine is finished. To increase the fuel concentration, the fuel concentration adjusting section 50 controls the flow rate of pure methanol supplied from the fuel supply section 40 in such a manner as to increase, and also controls the flow rate of water supplied from the water collection section 70 in such a way as to decrease. Consequently, an amount of methanol to be added to the fuel returned from the electricity generating section 30 is increased, so that the methanol concentration of fuel to be supplied to the electricity generating section 30 is increased.

In step 4, the mixer 51 compares the voltage Vu with the voltage Vd. If the voltage Vu is lower than the voltage Vd, the relation between the methanol concentration of fuel at the upstream-side generating section 32 and that at downstream-side generating section 33 is similar to that between the methanol concentrations $D_{u2}$ and $D_{d2}$ shown in FIG. 3. Thus, the procedure proceeds to step 5 so as to bring the methanol concentration closer to $D_{p1}$. In other cases, the procedure proceeds to END step. Thus, the fuel concentration control routine is finished.

In step 5, to bring the methanol concentration closer to $D_{p1}$, the mixer 51 controls the methanol concentration in such a way as to decrease. Thereafter, the procedure proceeds to END step. Thus, the fuel concentration control routine is finished. To reduce the fuel concentration, the fuel concentration adjusting section 50 controls the flow rate of pure methanol supplied from the fuel supply section 40 in such a manner as to decrease, and also controls the flow rate of water supplied from the water collection section 70 in such a way as to increase. Consequently, an amount of methanol to be added to the fuel returned from the electricity generating section 30 is decreased, so that the methanol concentration of fuel to be supplied to the electricity generating section 30 is reduced.

In this embodiment, the number of electricity generating devices of the upstream-side generating section 32 is equal to that of electricity generating devices of the downstream-side generating section 33. Therefore, the comparison between the voltages Vu and Vd is equivalent to that between an output power density per layer of the generating section 32 and that per layer of the generating section 33. In a case where the number of electricity generating devices of the upstream-side generating section 32 differs from that of electricity generating devices of the downstream-side generating section 33, the output power density per layer of the generating section 32 and that per layer of the generating section 33 are calculated. Then, control operations are performed by making comparison between the calculated output densities.

As above-mentioned, the output densities at the upstream-side generating section 32 and at the downstream-side generating section 33 are measured. If the output power density at the upstream-side generating section 32 is higher than that at the downstream-side generating section 33, the fuel concentration adjusting section 50 performs a control operation of increasing the methanol concentration of fuel. Conversely, if the output power density at the upstream-side generating section 32 is lower than that at the downstream-side generating section 33, the fuel concentration adjusting section 50 performs a control operation of decreasing the concentration of fuel. This control process is repeatedly performed, so that the fuel concentration adjusting section 50 can bring the methanol concentration of fuel supplied to the electricity generating section 30 to $D_{p1}$. Thus, control directed to a fuel concentration maximizing electricity generating efficiency can be implemented.

According to the fuel cell according to the first embodiment of the present invention and of the fuel cell operating method according to this embodiment of the present invention, an optimum fuel concentration for generating electricity can be realized only by measuring the output power density of the upstream-side generating section and that of the downstream-side generating section, without providing a concentration sensor in each of the generating sections. Because concentration sensors are unnecessary, simplification of configuration of and reduction in the size of the fuel cell can be achieved.

Second Embodiment

Another embodiment of a fuel cell and a fuel cell operating method, to each of which the present invention is applied, is described in detail with reference to the accompanying drawings. Incidentally, this embodiment differs from the first embodiment only in the configuration of the generating section. The configuration of each of other components is similar to that of a corresponding component described with reference to FIG. 1.

Figure 5:
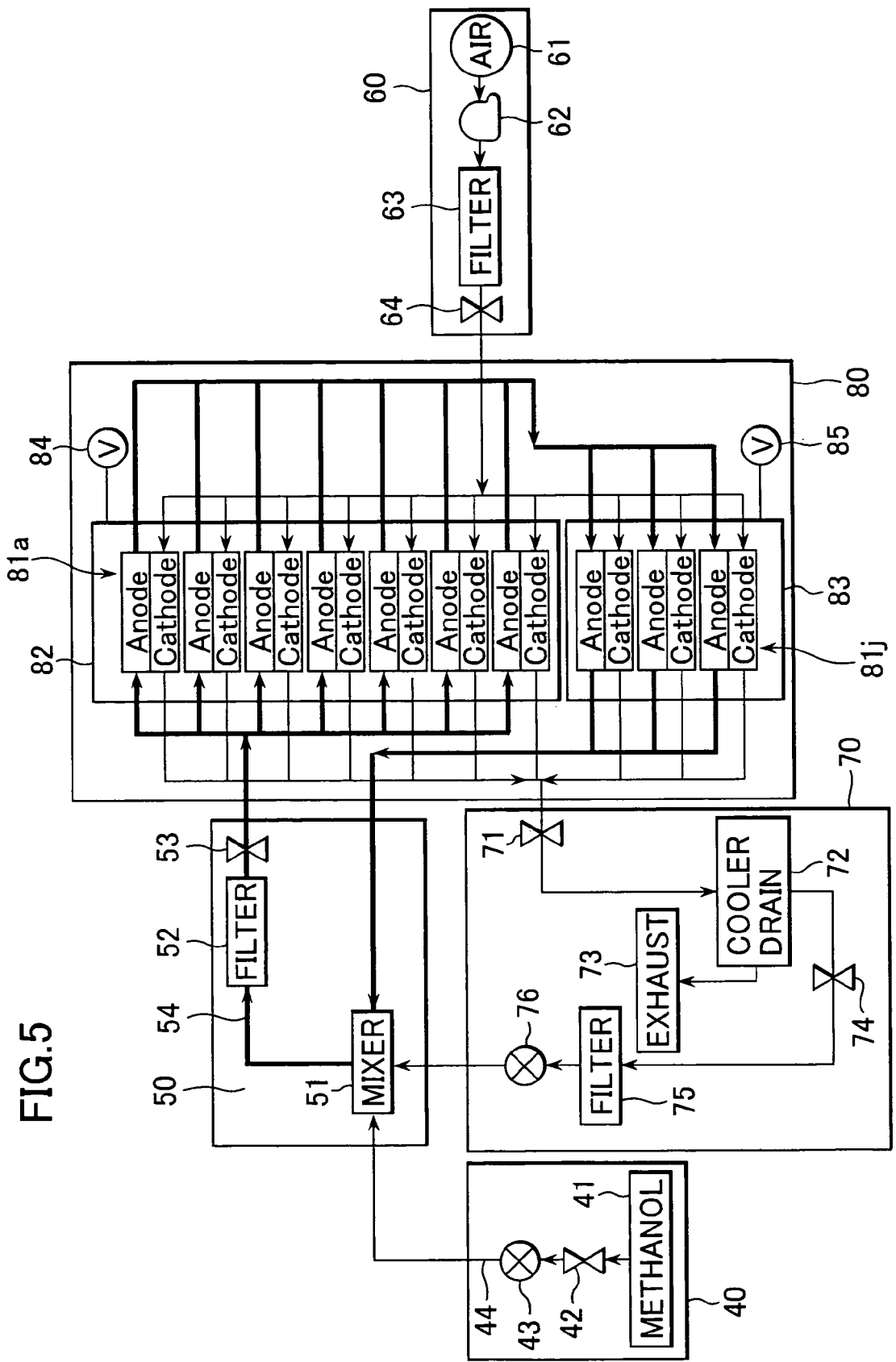
FIG. 5 is a block diagram illustrating the configuration of a fuel cell that is a first embodiment of the present invention, in which thick arrows indicate flows of fuel.

FIG. 5 is a block diagram illustrating the configuration of a fuel cell according to the present invention, which shows flows of fuel and air. As shown in this figures, the fuel cell has an electricity generating section 80 having a stack structure in which plural electricity generating devices are stacked, a fuel supply section 40 for supplying methanol serving as fuel, a fuel concentration adjusting section 50 for circulating fuel and for adjusting a fuel concentration, an air supply section 60 for supplying air, which contains oxygen, to the electricity generating section 80, and a water collection section 70 for collecting water generated in the electricity generating section 30. In this figure, thick arrows indicate flows of fuel at the sections, while thin arrows designate flows of air, water, and methanol.

The electricity generating section 80 has a cell stack structure in which ten layers of electricity generating devices respectively including MEAs 81a to 81j each having an electrolyte 13 sandwiched by electrodes 14 from both an anode side and a cathode side thereof are stacked, as shown in FIG. 2 to be described later. Among the MEAs of the ten layers of electricity generating devices, the seven MEAs 81a to 81g are arranged in parallel with flow of fuel at the upstream-side thereof to thereby constitute an upstream-side generating section 82, while the remaining three MEAs 81h to 81j are arranged in parallel with flow of fuel at the downstream-side thereof to thereby constitute a downstream-side generating section 83. An upstream-side voltmeter 84 for measuring a voltage Vu at the upstream-side generating section 82 is connected to the upstream-side generating section 82. A downstream-side voltmeter 85 for measuring a voltage Vd at the downstream-side generating section 83 is connected to the downstream-side generating section 83.

The layers of the upstream-side generating section 82 are connected in series with those of the downstream-side generating section 83 in the direction of flow of fuel. That is, the electricity generating devices of the upstream-side generating section 82 are connected in series with those of the downstream-side generating section 83 in the direction of flow of electric current, so that electric currents respectively flowing in the electricity generating devices are equal to one another. Therefore, an output power density of each of the electricity generating devices provided at the upstream-side can be obtained by measuring the voltage Vu at the stack structure of the upstream-side generating section 82 through the use of the upstream-side voltmeter 84 and then dividing the measured voltage Vu by the number of the electricity generating devices contained in the upstream-side generating section 82. Further, an output power density of each of the electricity generating devices provided at the downstream-side can be obtained by measuring the voltage Vd at the stack structure of the downstream-side generating section 83 through the use of the upstream-side voltmeter 85 and then dividing the measured voltage Vd by the number of the electricity generating devices contained in the downstream-side generating section 83.

The upstream-side generating section 82 and the downstream-side generating section 83 are connected in series with each other in the direction of flow of fuel. Fuel supplied from the fuel concentration adjusting section 50 passes through a fuel channel of each of the layers of the upstream-side generating section 82 and is then partly consumed at the anode side. Subsequently, the fuel, whose concentration is lowered by an electricity generating reaction in the upstream-side generating section 82, flows into a fuel channel of each of the layers of the downstream-side generating section 83. The fuel having passed through the downstream-side generating section 83 reaches the fuel concentration adjusting section 50 again. Thus, the fuel circulates between the electricity generating section 30 and the fuel concentration adjusting section 50. Oxygen used for generating electricity in the upstream-side generating section 82 and the downstream-side generating section 83 is supplied to an air channel of each of the layers. Water generated at the cathode side at generation of electricity is exhausted together with air to the water collection section 70.

The fuel supply section 40 is a section for supplying methanol, which is used in the electricity generating section 80 as fuel, to the fuel concentration adjusting section 50. A fuel tank 41, a valve 42, and a pump 43 are connected to the fuel supply section 40 through a pipe 44 that is connected to the fuel concentration adjusting section 50. Pure methanol is stored in the fuel tank 41. Methanol is supplied therefrom to the fuel concentration adjusting section 50 by opening and closing the valve 42 and driving a pump 43. An amount of methanol to be supplied to the fuel concentration adjusting section 50 can be adjusted by adjusting the valve 42 and controlling the pump 43.

A mixer 51, a filter 52, and a valve 53 are connected to the fuel concentration adjusting section 50 through a fuel pipe 54. The mixer 51 adjusts the methanol concentration of fuel, which is an aqueous solution containing methanol, by mixing pure methanol supplied from the fuel supply section 40, fuel collected from the electricity generating section 80, and water supplied from the water collection section 70 according to the voltage Vu measured by the upstream-side voltmeter 84 and the voltage Vd measured by the downstream-side voltmeter 85. The filter 52 filtrates dust and impurities from fuel to thereby eliminate the dust and the impurities. The valve 53 adjusts an amount of fuel supplied to the electricity generating section 80 by controlling opening/closing thereof. The fuel, whose methanol concentration is adjusted by the mixer 51, is sent to the electricity generating section 80 through the fuel pipe 54. In this embodiment, the rate of flow of fuel is controlled so that the utilization factor of methanol is 40% if fuel having a concentration of 3% circulates once in the electricity generating section 80, so as to set the methanol concentration to be a dominant factor affecting the electricity generating efficiency.

The air supply section 60 has an outside air intake 61, a blower 62, a filter 63, and a valve 64. Air containing oxygen is taken in from the outside air intake 61, and the air is then supplied by the blower 62 to the electricity generating section 80. The filter 63 removes dust from the air taken in from the outside air intake 61. Then, the flow rate of the air is adjusted, and subsequently sent to the electricity generating section 80.

The water collection section 70 collects water generated at the cathode side of each of the layers of the electricity generating section 80. Exhaust gas having passed through the cathode side of each of the layers of the electricity generating section 80 contains water generated in the electricity generating reaction and is exhausted to the water collection section 70. In the water collection section 70, the flow rate of the exhaust gas is adjusted by the valve 71. Then, the exhaust gas is cooled down by a cooler drain 72 to thereby distill steam. Dry air, from which water has been eliminated by the cooler drain 72, is exhausted to the atmosphere. The water having been extracted from the cooler drain 72 is sent by a pump 76 through a valve 74 and a filter 75 to the fuel concentration adjusting section 50, in which the water is used for adjusting the concentration of fuel. At that time, the quantity of the water supplied to the fuel concentration adjusting section 50 is adjusted by controlling opening/closing of the valve 74 and also controlling driving of the pump 76. The filter 75 removes dirt and impurities contained in the water.

Thus, in the fuel cell shown in FIG. 5, the fuel supply section 40 supplies pure methanol to the fuel concentration adjusting section 50. Then, the fuel concentration adjusting section 50 adjusts a fuel concentration by mixing fuel, which is returned from the electricity generating section 80, and pure methanol supplied from the fuel supply section 40. Subsequently, the fuel concentration adjusting section 50 circulates the fuel to the electricity generating section 80. The water supplied from the water collection section 70 is also used for adjusting the fuel concentration of the fuel concentration adjusting section 50. In the electricity generating section 80, the fuel sent from the fuel concentration adjusting section 50 is first used at the upstream-side generating section 82. Then, the fuel, whose concentration is reduced, is used at the downstream-side generating section 83. Thus, electricity is generated therein.

In the fuel cell illustrated in FIG. 5, the number of layers of electricity generating devices of the upstream-side generating section 82 is larger than that of layers of electricity generating devices of the downstream-side generating section 83. Thus, the flow rate of fuel flowing in one layer of the downstream-side generating section 83 is higher than that of fuel flowing through one layer of the upstream-side generating section 82. Consequently, even if methanol of fuel is partly consumed in an electricity generating reaction of the upstream-side generating section 82 and the methanol concentration of fuel to be utilized at the downstream-side generating section 83 is reduced, an amount of methanol to be supplied to each one layer of the downstream-side generating section 83 can be increased.

That is, although the concentration of fuel to be used for generating electricity at the downstream-side generating section 83 is lower than that of fuel flowing through the upstream-side generating section 82, an amount of methanol supplied per unit of time can be increased because the flow rate of fuel flowing through the downstream-side generating section 83 is large. This enhances the electricity generating efficiency of the downstream-side generating section 83, so that the methanol component to be consumed during one circulation of fuel between the fuel concentration adjusting section 50 and the electricity generating section 80 can be increased. Thus, the relation between the methanol concentration and the output power density illustrated in FIG. 3 is changed. It is considered that the methanol concentration, at which the output power density of the fuel cell is maximized, becomes higher than that indicated in FIG. 3.

Figure 6:
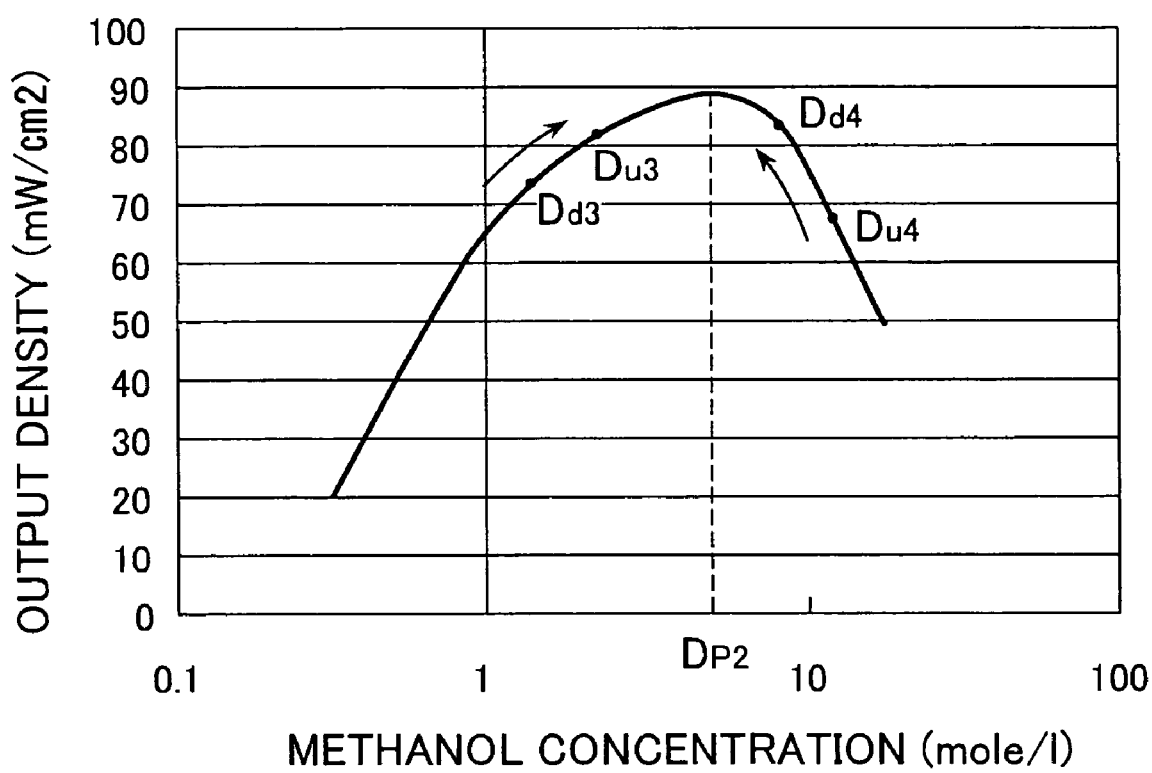
FIG. 6 is a graph illustrating the relation between the methanol concentration of fuel in a second embodiment of the present invention and an output power density thereof.

FIG. 6 is a graph illustrating the relation between the methanol concentration of fuel in the fuel cell shown in FIG. 5 and an output power density thereof. Similarly as the graph of FIG. 3 shows, FIG. 6 shows that if the methanol concentration of fuel supplied to the electricity generating device is low, methanol to be used for generating electricity is not sufficiently supplied thereto, so that the output power density thereof is reduced. Conversely, if the methanol concentration of fuel supplied to the electricity generating device is high, water needed for conduction of protons in the electrolyte at an electricity generating reaction becomes insufficient, so that the electricity generating reaction proceeds weakly, and that the output power density becomes low.

Although the methanol concentration $D_{p2}$ (mole/l), at which the output power density has a maximum value, is shifted to a higher concentration side than $D_{p1}$ indicated in FIG. 3, the electricity generating efficiency of the fuel cell can be maximized in this embodiment by adjusting the methanol concentration of the fuel cell so that the fuel density always has the value $D_{p2}$.

Let $D_{u3}$ and $D_{d3}$ respectively denote a methanol concentration at the upstream-side generating section 82 and a methanol concentration at the downstream-side generating section 83 in the case where the concentration of methanol supplied to the upstream-side generating section 82 is lower than the methanol concentration $D_{p2}$, at which the output power density is maximized. As shown in the graph, in a case that the methanol concentration is equal to or lower than $D_{p2}$, the higher the methanol concentration, the higher the output power density. Thus, the output power density at the methanol concentration $D_{u3}$ becomes higher than the output power density at the methanol concentration $D_{d3}$. Consequently, in the case where the output power density per layer of the upstream-side generating section 82 is higher than that per layer of the downstream-side generating section 83, the methanol concentration can be brought closer to the methanol concentration $D_{p2}$, at which the output power density is maximized, by increasing the methanol concentration of fuel.

Let $D_{u4}$ and $D_{d4}$ respectively denote a methanol concentration at the upstream-side generating section 82 and a methanol concentration at the downstream-side generating section 83 in the case where the concentration of methanol supplied to the upstream-side generating section 82 is higher than the methanol concentration $D_{p2}$, at which the output power density is maximized. As shown in the graph, in a case that the methanol concentration is equal to or higher than $D_{p2}$, the higher the methanol concentration, the lower the output power density. Thus, the output power density at the methanol concentration $D_{u4}$ becomes lower than the output power density at the methanol concentration $D_{d4}$. Consequently, in the case where the output power density per layer of the upstream-side generating section 82 is lower than that per layer of the downstream-side generating section 83, the methanol concentration can be brought closer to the methanol concentration $D_{p2}$, at which the output power density is maximized, by decreasing the methanol concentration of fuel.

Even in a case that the methanol concentration at the upstream-side generating section 82 is higher than the methanol concentration $D_{p2}$, and that the methanol concentration at the downstream-side generating section 83 is lower than the methanol concentration $D_{p2}$, if the output power density at the upstream-side is higher than that at the downstream-side, the methanol concentration is controlled in such a way as to be increased, as above-mentioned. If the output power density at the upstream-side is lower than that at the downstream-side, the methanol concentration is controlled in such a way as to be decreased. In a case where the output power density at the upstream-side generating section 82 is equal to that at the downstream-side generating section 83, the methanol concentration of fuel is unchanged.

A method of controlling the methanol concentration of fuel in such a way as to become $D_{p2}$ is similar to that described in the description of the first embodiment, and performed by causing the fuel concentration adjusting section 50 to adjust the flow rate of pure methanol supplied from the fuel supply section 40 and to adjust the flow rate of water supplied from the water collection section 70. In the second embodiment, the number of electricity generating devices of the upstream-side generating section 82 differs from that of electricity generating devices of the downstream-side generating section 83. Thus, it is determined by comparing the output power density per layer of the upstream-side generating section 82 with that per layer of the downstream-side generating section 83 whether or not the fuel concentration is increased.

As above-mentioned, the output densities at the upstream-side generating section 82 and at the downstream-side generating section 83 are measured. If the output power density per layer of the upstream-side generating section 82 is higher than that per layer of the downstream-side generating section 83, the fuel concentration adjusting section 50 performs a control operation of increasing the methanol concentration of fuel. Conversely, if the output power density per layer of the upstream-side generating section 82 is lower than that per layer of the downstream-side generating section 83, the fuel concentration adjusting section 50 performs a control operation of decreasing the concentration of fuel. This control process is repeatedly performed, so that the fuel concentration adjusting section 50 can bring the methanol concentration of fuel supplied to the electricity generating section 80 to $D_{p2}$. Thus, control directed to fuel concentration maximizing electricity generating efficiency can be implemented.

Additionally, the flow rate of fuel supplied to the downstream-side generating section 83 can be made to be higher than that supplied to the upstream-side generating section 82 by setting the number of electricity generating devices of the upstream-side generating section 82 to be larger than that of electricity generating devices of the downstream-side generating section 83. Consequently, the electricity generating efficiency of the downstream-side generating section 83 can be enhanced.

According to the fuel cell according to the second embodiment of the present invention and of the fuel cell operating method according to this embodiment of the present invention, an optimum fuel concentration for generating electricity can be realized only by measuring the output power density of the upstream-side generating section and that of the downstream-side generating section, without providing a concentration sensor in each of the generating sections. Because concentration sensors are unnecessary, simplification of configuration of and reduction in the size of the fuel cell can be achieved.

What is claimed is:

1. A method of operating a fuel cell comprising at least a first and second electricity generating unit, each electricity generating unit being comprised of a plurality of membrane electrode assemblies, each membrane electrode assembly comprised of an electrolyte, a fuel electrode, and an air electrode, and wherein the first and second electricity generating units are arranged serially in the direction of fuel flow, the method comprising the step of:
   adjusting a concentration of supplied fuel to the first electricity generating unit based upon an output power at the first generating unit relative to an output power at the second electricity generating unit, the first electricity generating unit being disposed at an upstream-side in a flow direction of the fuel, the second electricity generating unit being disposed at a downstream-side in the flow direction of the fuel, and wherein the fuel concentration at the second electricity generating unit is less than a fuel concentration at the first electricity generating unit.

2. The method of operating a fuel cell according to claim 1, further comprising the steps of:
   collecting water produced by generating electricity at the electricity generating units, and
   utilizing the water for adjusting the fuel concentration.

3. The method of operating a fuel cell according to claim 1, further comprising the step of:
   mixing the fuel, which has passed through the second electricity generating unit with fuel with a higher concentration, and
   returning the fuel mixed to the first electricity generating unit.

4. The method of operating a fuel cell according to claim 1, wherein a volume of the fuel that flows through the first electricity generating unit is substantially equal to a volume of fuel that flows through the second electricity generating unit.

5. The method of operating a fuel cell according to claim 1, wherein a volume of the fuel that flows through the first electricity generating unit is less than a volume of fuel that flows through the second electricity generating unit.

6. The method of operating a fuel cell according to claim 1, further comprising the step of:
   setting a fuel concentration at a higher value if the output power density at the first electricity generating unit is higher than that of the second electricity generating unit.

7. The method of operating a fuel cell according to claim 1, further comprising the step of:
   setting the fuel concentration at a lower value if the output power density of the first electricity generating unit is lower than that of the second electricity generating unit.

8. The method of operating a fuel cell according to claim 1, further comprising the step of:
   providing more membrane electrode assemblies in the second electricity generating unit than there are in the first electricity generating unit.

* * * * *